United States Patent
Mathes et al.

(10) Patent No.: US 6,878,359 B1
(45) Date of Patent: Apr. 12, 2005

(54) PROCESS AND DEVICE FOR THE SELECTIVE CATALYTIC REDUCTION OF NITROGEN OXIDES IN AN OXYGEN-CONTAINING GASEOUS MEDIUM

(75) Inventors: Wieland Mathes, Michelau (DE); Raimund Müller, Dörfleins (DE); Klaus Rusch, Geisfeld (DE); Petra Anette Rusch, Geisfeld (DE); Ralf Sigling, Alpharetta, GA (US)

(73) Assignee: Siemens Aktiengesellschaft, Munich (DE)

( * ) Notice: Subject to any disclaimer, the term of this patent is extended or adjusted under 35 U.S.C. 154(b) by 792 days.

(21) Appl. No.: 09/711,867

(22) Filed: Nov. 13, 2000

Related U.S. Application Data

(63) Continuation of application No. PCT/DE99/01367, filed on May 6, 1999.

(30) Foreign Application Priority Data

May 11, 1998 (DE) .......................................... 198 21 055

(51) Int. Cl.[7] ............................. B01J 8/00; C01B 21/00
(52) U.S. Cl. ..................................... 423/239.1; 423/235
(58) Field of Search ............................... 423/235, 239.1

(56) References Cited

U.S. PATENT DOCUMENTS 5,785,937 A * 7/1998 Neufert et al. ............ 423/213.2
5,884,475 A * 3/1999 Hofmann et al. ............. 60/274
5,974,789 A * 11/1999 Mathes et al. ................. 60/274

FOREIGN PATENT DOCUMENTS

| DE | 42 00 514 A1 | 7/1993 | |
|---|---|---|---|
| EP | 0 555 746 A1 | 8/1993 | |
| EP | 0 558 452 A1 | 9/1993 | |
| EP | 0 583 878 A1 | 2/1994 | |
| EP | 0 487 886 B1 | 4/1994 | |
| WO | WO 9707876 A2 * | 3/1997 | .......... B01D/53/94 |

OTHER PUBLICATIONS

"SINOx, Sickoxidminderung für stationäre Dieselmotoren", Siemens Energieerzeugung, dated 1997, 4 pages.

* cited by examiner

Primary Examiner—Stanley S. Silverman
Assistant Examiner—Jonas N. Strickland
(74) Attorney, Agent, or Firm—Laurence A. Greenberg; Werner H. Stemer; Ralph E. Locher

(57) ABSTRACT

The process and the device are provided for the selective catalytic reduction of nitrogen oxides in an oxygen-containing gaseous medium. The reducing agent required for the reaction is prepared in a separate preparation reactor. A substance that can be converted into the reducing agent is introduced into a carrier gas in the preparation reactor and, as a result, is converted by substantially thermal conversion. The energy required for the conversion is provided by the carrier gas.

7 Claims, 2 Drawing Sheets

PROCESS AND DEVICE FOR THE SELECTIVE CATALYTIC REDUCTION OF NITROGEN OXIDES IN AN OXYGEN-CONTAINING GASEOUS MEDIUM

CROSS-REFERENCE TO RELATED APPLICATION

This is a continuation of copending International Application PCT/DE99/01367, filed May 6, 1999, which designated the United States.

BACKGROUND OF THE INVENTION

Field of the Invention

The invention relates to a process for the selective catalytic reduction of nitrogen oxides in an oxygen-containing gaseous medium. The process uses a substance which can be converted into a reducing agent. The substance is first converted into the reducing agent by substantially thermal means in a separate preparation reactor and then the reducing agent is added to the gaseous medium upstream of a reduction catalytic converter in order to react with the nitrogen oxides. The gaseous medium is, for example, the exhaust gas from a combustion system or an oxygen-containing process gas from a commercial or industrial plant, e.g. from the chemical industry. In principle, it is possible to treat any oxygen-containing gas which is to be deNOxed. Furthermore, the invention relates to a device for carrying out the above process.

The process of selective catalytic reduction (SCR) for eliminating nitrogen oxides from an oxygen-containing gaseous medium has by now become established as a process which can be successfully managed on an industrial scale. The process is used in particular for deNOxing exhaust gases from combustion systems, including diesel engines. In the process, the nitrogen oxides contained in the exhaust gas are reacted to form molecular nitrogen and water in the presence of oxygen on a selectively operating reduction catalytic converter by means of a suitable reducing agent. A catalyst based on titanium oxide which also contains additions of molybdenum trioxide, tungsten trioxide and/or vanadium pentoxide, has proven suitable for the reduction catalytic converter. Ammonia ($NH_3$) has proven to be the most effective and successful reducing agent, compared to other reducing agents such as hydrocarbons or cyanuric acid.

However, since ammonia is a strongly smelling and, at high concentrations, also a toxic compound, there are regulations on safe storage and handling which are specific to individual countries. In particular, considerable safety precautions, which entail costs, have to be taken if ammonia is to be carried along in a suitably protected tank to be used as a reducing agent for cleaning the exhaust gases from diesel-powered passenger automobiles, commercial vehicles, or other vehicles.

One possible solutions to the problem is described in a Siemens brochure "SINOX, Stickoxidminderung für station äre Dieselmotoren" [SINOX, Abatement of Nitrogen Oxides for Stationary Diesel Engines], Order No. A 96001-U91-A232, 1997, in which it is proposed to use a substance which can be converted into ammonia, namely urea, instead of ammonia. This is because compared to ammonia urea is altogether harmless when being transported and stored. To reduce the nitrogen oxides, an aqueous urea solution is thereby sprayed directly into the exhaust gas line upstream of the reduction catalytic converter. On account of the relatively high exhaust gas temperatures, the urea is broken down into ammonia by pyrolysis and by hydrolysis. The resulting ammonia is then reacted with the nitrogen oxides as the actual reducing agent at the reduction catalytic converter in the manner described above.

However, with a process of that nature a series of technical questions remain unanswered. For example, breaking down urea in the gas stream involves the problem of the formation of undesirable byproducts, which in some cases form solid, insoluble deposits on components downstream of the reaction location. Undesirable byproducts of this nature include cyanuric acid, from which insoluble melamines are formed, or ammonium sulfates, which are formed if sulfur oxides are present. In addition, the urea may also crystallize out before or during the injection into the gas stream and may lead to the parts which carry urea becoming blocked.

To solve these problems, it has become known for the urea to be particularly finely atomized during its introduction into the gas stream, to use a suitable catalyst in order to assist hydrolysis, or to spray the urea onto a vaporizer arranged in the gas stream in order to achieve rapid decomposition. Solutions of this type are known, for example, from European patent EP 0 487 886 B1 for an exhaust gas stream.

Particularly in a large-scale plant, such as a fossil-fired power plant, in which, for treating the exhaust gas, the reducing agent has to be introduced into the exhaust gas by means of an injection grate which comprises a multiplicity of nozzles, in order to achieve a uniform distribution in the exhaust gas duct, however, when urea is used it is still necessary, as before, for each individual nozzle to be controlled separately, in order, in the event of one nozzle becoming blocked, to be able to balance the amount of reducing agent required by supplying more to the other nozzles. This is because even the measures listed cannot rule out the possibility of a nozzle becoming blocked.

As an alternative to the urea being broken down in the exhaust gas stream, it is also described, in the European patent EP 0 487 886 B1, for the urea to be broken down outside the exhaust gas stream. A urea solution is thereby applied to a heated vaporizer in a separate preparation reactor, by means of a spray device, for pyrolysis, and the gas mixture formed is passed over a downstream hydrolysis catalytic converter. Only then is the gas mixture of ammonia and residues which is formed introduced into the exhaust gas stream. The amount of ammonia metered in is regulated by regulation of the amount of gas mixture.

In this way, undesirable byproducts are not formed directly inside the exhaust gas stream from the combustion system, but rather outside this stream, where fewer adverse effects are to be expected.

With a procedure of this type, however, the vaporizer must be heated to the temperature required for hydrolysis with additional energy. This is because, unlike a vaporizer situated in the exhaust gas stream, the separate vaporizer is not preheated by the hot exhaust gas flowing past it. To achieve economic operation, a rather small area is selected for the vaporizer, so that it is possible to achieve the hottest possible surface of the vaporizer with the lowest possible energy consumption.

In a large-scale industrial plant in which the exhaust gas duct has a large cross section and/or in which there is a high volumetric flow rate of exhaust gas, such as a fossil-fired power plant or a gas turbine or a large-scale plant used in the chemical industry in which a large amount of process gas which is to be deNOxed is produced per unit time, however, the surface area of the vaporizer has to be selected to be sufficiently large to ensure that the urea is broken down into ammonia as completely as possible. However, to heat a large-area vaporizer of this nature to the temperature required for conversion into the reducing agent, a high additional input of energy is required. This makes the process according to the prior art uneconomical for large-scale plants, for which reason it is not used, for example, for gas turbines and fossil-fired power plants with large exhaust gas duct cross sections or large-scale plants used in the chemical industry with a high quantity of process gas which has to be deNOxed.

SUMMARY OF THE INVENTION

The object of the invention is to provide a process for the selective catalytic reduction of nitrogen oxides in an oxygen-containing gaseous medium using a substance which can be converted into a reducing agent, which overcomes the above-noted deficiencies and disadvantages of the prior art devices and methods of this kind, and which avoids the drawbacks of direct introduction of the as yet unconverted substance into the gaseous medium and, at the same time, works effectively and economically in particular in large-scale plants with a high volumetric flow rate of exhaust gas or a high quantity of process gas or other gas which is to be deNOxed being produced per unit time. A further object of the invention is to provide a device for carrying out the process with particularly simple technical means.

With the above and other objects in view there is provided, in accordance with the invention, a process for the selective catalytic reduction of nitrogen oxides in an oxygen-containing gaseous medium, which comprises:

conducting a carrier gas through a preparation reactor disposed outside a stream of a gaseous medium;

introducing a substance to be converted into reducing agent into the carrier gas and converting the substance into reducing agent in the preparation reactor, and thereby supplying energy for a thermal conversion with the carrier gas;

adding the reducing agent to the gaseous medium upstream of a reduction catalytic converter and reducing nitrogen oxides in the gaseous medium; and branching off a portion of the carrier gas after having passed through the preparation reactor and feeding back the portion to the preparation reactor.

In other words, the substance is first converted into the reducing agent by substantially thermal means in a separate preparation reactor and then the reducing agent is added to the gaseous medium upstream of the reduction catalytic converter in order to react with the nitrogen oxides. In the invention, the substance is introduced into the carrier gas flowing through the preparation reactor and is converted in the carrier gas. The energy necessary for the thermal conversion is provided by the carrier gas.

The invention is based on the consideration that, when using a vaporizer for transferring energy from the vaporizer to the substance which is to be converted only the relatively short period of direct contact between the substance and the vaporizer surface is available. Therefore, to convert a given amount of substance by means of a vaporizer, more energy has to be supplied than would theoretically be required for the thermal decomposition of the substance. For this reason, the conversion of the substance into the reducing agent by means of a separate vaporizer becomes less economical as the amount of gas to be treated per unit time increases and therefore as the amount of reducing agent required rises.

However, compared to the use of a vaporizer, the energy required for conversion of the substance can be reduced considerably if the energy is input via a carrier gas into which the substance is introduced. For this purpose, the carrier gas may, for example, be heated, in which case, of course, the conversion proceeds more quickly the higher the temperature of the carrier gas. The substance takes up energy from the surrounding carrier gas until it is broken down or converted by thermal means. The time which is available for the energy transfer is extended to the entire duration of the reaction. For this reason, the temperature of the carrier gas can be selected to be lower than the temperature of a vaporizer which is correspondingly provided for the conversion. For example, a standard temperature for a vaporizer which is used for the hydrolysis of urea to form ammonia is approx. 200 to 300° C., whereas for the hydrolysis of urea in a heated carrier gas the latter only needs to be at a temperature of approx. 150 to 200° C.

Also, when an injection grate is being used to introduce the reducing agent into the gaseous medium, in particular an exhaust gas stream, it is no longer necessary for each individual nozzle of the injection grate to be controlled separately, since the introduction nozzles are prevented from becoming blocked by byproducts of the reaction. On the other hand, there is also no need for each introduction device for introducing the substance into the preparation reactor to be controlled separately, so that it is still possible to control the amount of substance to be introduced in the event of a blockage, if the amount of reducing agent which is to be introduced per unit time is controlled in a supply line for the reducing agent leading from the preparation reactor to the gaseous medium, i.e. after conversion of the substance has taken place.

Suitable carrier gases are in principle any gas which is inert with regard to the desired thermal conversion of the substance. Air as well is particularly suitable as one such carrier gas.

The carrier gas may be heated both indirectly and directly, in a manner known per se, by heat exchangers which are arranged along the gas stream, with gas, vapor or liquid as the heat source, by electric heater coils or by heating a reservoir for the carrier gas. It is also possible, for example, for hot steam to be sprayed into the carrier gas.

With a hot gaseous medium, it is particularly advantageous if a part-stream of the gaseous medium is branched off from the main stream, and this branched-off part-stream itself is passed through the preparation reactor as the carrier gas and is added to the main stream of the gaseous medium again together with the reducing agent. This design is particularly recommended for the treatment of the exhaust gas from a combustion system, since the exhaust gas from the combustion system is generally already at the temperature required for the conversion of the substance. In this case, it is also possible to dispense with separate heating of the carrier gas. Also, there is no need for any additional carrier gas.

In accordance with an advantageous configuration of the invention, some of the carrier gas is branched off after it has passed through the preparation reactor and is fed back to the preparation reactor via a return line. In this way, the supply of carrier gas can be reduced and, at the same time, the concentration of reducing agent in the outlet of the preparation reactor can be increased. Therefore, the concentration of reducing agent which is fed to the gaseous medium can be regulated by controlling the amount of flow passing through the return line.

Advantageously, the substance which is provided for the conversion may also itself be preheated before it is introduced into the carrier gas in the preparation reactor. In this way, the carrier gas itself may be at a lower temperature than would be required for conversion of the substance.

The preheating of the substance may take place in the same way as the heating of the carrier gas.

Furthermore, it is advantageous if the substance is injected into the preparation reactor by means of a pressure line. In this way, intimate mixing of the carrier gas with the substance to be converted is achieved in the preparation reactor.

A convertible substance is understood as meaning any substance which can be at least partially converted by thermal means into a reducing agent which is suitable for the SCR process, in particular precursors of reducing agents, such as hydrocarbons, cyanuric acid or ammonia. Examples of substances which release ammonia include ammonium carbonate, ammonium hydrogen carbonate or urea.

Since ammonia is an excellent reducing agent for the SCR technique and a range of technically developed catalytic converters for the reaction of the nitrogen oxides by means of ammonia are known, it is advantageous to use an aqueous urea solution for the substance, from which solution ammonia is formed as the reducing agent in the preparation reactor by vaporization, pyrolysis and hydrolysis. To form ammonia, it is also possible for the substance used to be ammonia water.

The conversion of the substance in the carrier gas can be improved further if the carrier gas together with the substance which has been introduced is additionally brought into contact with a catalyst which catalyzes the conversion of the substance into the reducing agent. A catalyst which is based on titanium dioxide with additions of vanadium pentoxide, aluminum oxide and/or silicon oxide is particularly suitable for the hydrolysis of urea. It has been found that it is particularly advantageous if the vanadium pentoxide content of the catalyst is between 0.02 and 1.3% by weight. Suitable catalysts are in principle catalysts which are known per se in plate or honeycomb form with support materials made from metal, ceramic or other heat-resistant materials.

With the above and other objects in view there is also provided, in accordance with the invention, a device for the selective catalytic reduction of nitrogen oxides in an oxygen-containing gaseous medium using a substance to be converted into a reducing agent, the device comprising:

a gas line for carrying a gaseous medium in a given flow direction;

a reduction catalytic converter disposed in the gas line and configured to conduct the gaseous medium therethrough;

a preparation reactor connected in parallel with the gas line for converting a substance to a reducing agent by substantially thermal conversion, the preparation reactor having an inlet for the substance, an outlet for the reducing agent, and a feed point;

a supply line for a carrier gas connected to the preparation reactor at the feed point, wherein the carrier gas can flow through the preparation reactor from the feed point toward the outlet for the reducing agent, and the inlet into the preparation reactor being configured to introduce the substance into the carrier gas;

a discharge line connected between the outlet for the reducing agent and the gas line at a location upstream of the reduction catalytic converter in the flow direction of the gaseous medium; and a branch line connecting the discharge line of the preparation reactor with the supply line.

In other words, device has a gas line for carrying the gaseous medium, a reduction catalytic converter, which is arranged in the gas line and through which the gaseous medium can flow, and a preparation reactor, which is arranged in parallel with the gas line, for the substantially thermal conversion of the substance into the reducing agent. The preparation reactor has an inlet for the substance and an outlet for the reducing agent, and a discharge line is connected to the outlet, which line opens out into the gas line upstream of the reduction catalytic converter, as seen in the direction of flow of the gaseous medium. In the novel device, the supply line for the carrier gas is connected to the preparation reactor via a feed point, the carrier gas can flow through the preparation reactor from the feed point toward the outlet for the reducing agent, and the inlet is configured for the introduction of the substance into the carrier gas.

The supply line for the carrier gas is preferably designed as a compressed-gas line, so that the carrier gas flows through the preparation reactor from the feed point toward the outlet. The carrier gas may, for example, be taken from a pressure cylinder or as a process gas at a suitable point in the plant to which the device is connected. The carrier gas used may also be steam or exhaust gas or a mixture of various gases which have substantially no effect on the conversion of the substance into the reducing agent. It is advantageous if the carrier gas is air, for example in the form of compressed air. It is advantageous if the carrier gas can be heated. In accordance with an advantageous feature of the invention, the carrier gas can be heated with an electric heater device, making temperature control for the carrier gas particularly simple.

However, in an advantageous configuration of the invention, a heat exchanger is arranged on the supply line in order to heat the carrier gas. A hot exhaust gas from the combustion system can be passed over this heat exchanger, so that there is no need for a heater device which has to be supplied with additional energy.

With hot gaseous media, the same advantage is obtained if at least part of the gaseous medium itself is used as a carrier gas. For this purpose, the supply line of the preparation reactor is advantageously connected to the gas line of the combustion system upstream of the reduction catalytic converter, as seen in the direction of flow of the gaseous medium, and at least a part-stream of the gaseous medium can flow through the supply line as the carrier gas. The part-stream of the gaseous medium may be either actively sucked into the supply line or passed passively into the supply line via a suitably designed connection piece. It is also possible to utilize the natural pressure gradient in the gas line for flow through the preparation reactor if the connection of the supply line for the preparation reactor is arranged upstream of the connection of the discharge line of the preparation reactor, as seen in the direction of flow of the gaseous medium. The configuration described is recommended in particular for an exhaust gas from a combustion system which is at a temperature required for the conversion of the substance.

The amount of carrier gas fed to the preparation reactor is easy to regulate via a pressure regulator which comprises, for example, a pressure sensor, the output signals of which are used by a proportional/integral controller to control a pump or a valve arranged in the supply line.

In another advantageous configuration of the invention, a branch line which opens out into the supply line is arranged on the outlet line of the preparation reactor. A system of this nature, which is also known as a loop reactor, makes it possible to regulate the concentration of reducing agent in the discharge line by limiting the flow through the branch line.

To inject the substance into the preparation reactor, it is advantageous if the inlet for the substance is connected to a pressurizable reservoir and opens out into an injection device in the preparation reactor. Alternatively, it is also possible to connect a pump with pressure line to the inlet. In this way, it is possible to achieve simple and effective mixing of the substance with the carrier gas flowing through the preparation reactor.

For the injection device itself, it is possible to use a one-fluid nozzle or, advantageously, a two-fluid nozzle. With a two-fluid nozzle which is additionally connected to a compressed gas, it is possible to achieve particularly fine atomization of the substance into the carrier gas and therefore good thermal conversion of the substance into the reducing agent.

In addition to heating of the carrier gas, it is furthermore advantageous if the substance to be converted is heated in addition. In this way, it is possible to improve the conversion of the substance into the reducing agent. To heat the substance, it is recommended for an electric heater to be arranged on the reservoir or the supply line.

To assist the conversion of the substance into the reducing agent, it is furthermore advantageously possible for a catalyst which assists the conversion to be arranged in the preparation reactor.

To achieve good conversion of the substance into the reducing agent, it is advantageous if the ratio of inflow area of the catalyst to the amount of the substance passing through the preparation reactor is between 0.001 and 0.01 $m^2/l/h$.

Other features which are considered as characteristic for the invention are set forth in the appended claims.

Although the invention is illustrated and described herein as embodied in a process and device for the selective catalytic reduction of nitrogen oxides in an oxygen-containing gaseous medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
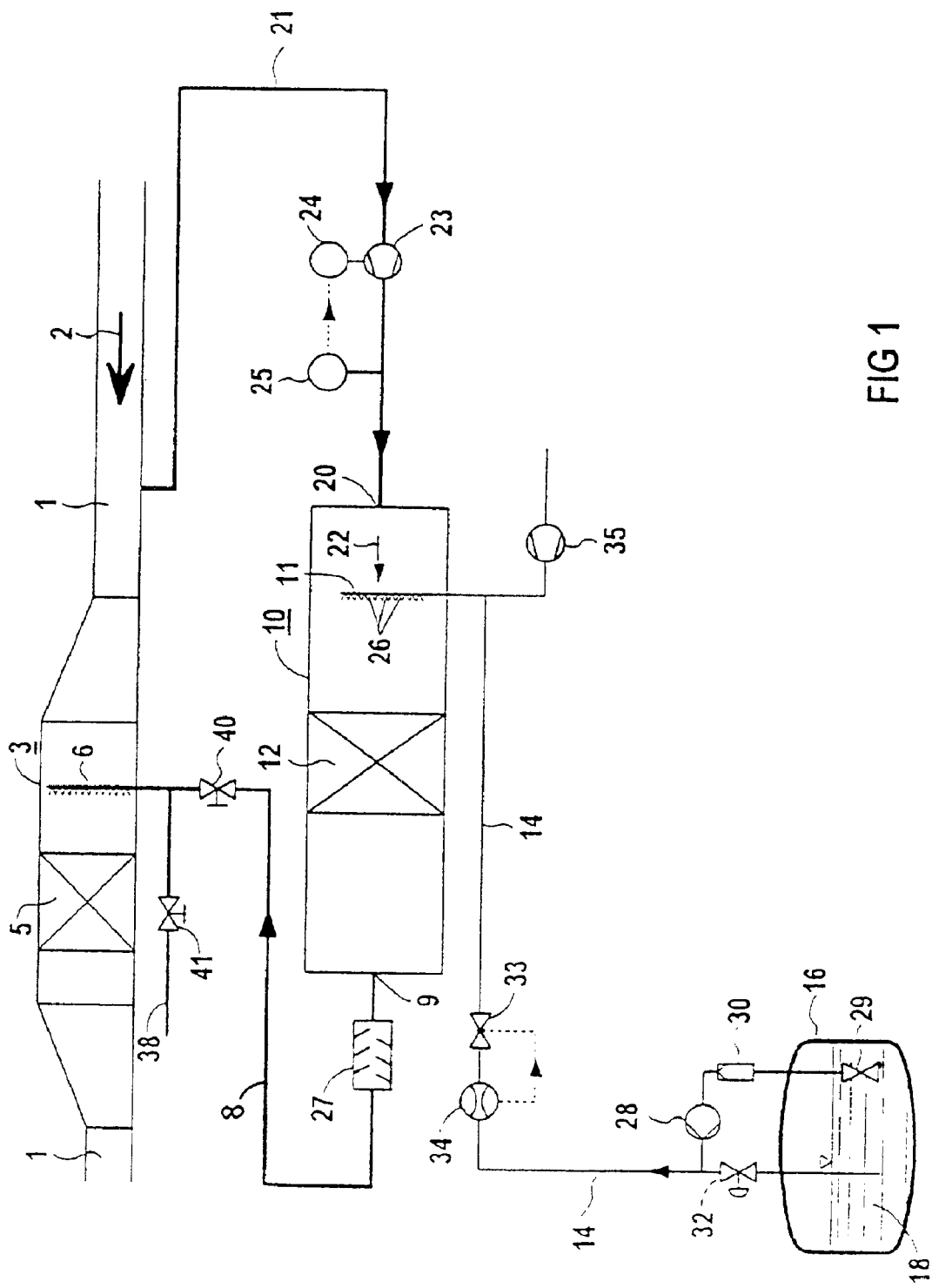
FIG. 1 is a diagrammatic view of a device for carrying out the process according to the invention for cleaning the exhaust gas from a gas turbine, wherein urea is converted into the reducing agent ammonia in a separate preparation reactor, part of the exhaust gas from the gas turbine being branched off as heated carrier gas.

Referring now to the figures of the drawing in detail and first, particularly, to FIG. 1 thereof, there is seen a device for the selective catalytic reduction of nitrogen oxides. The device is provided for the deNOxing of the exhaust gas from a gas turbine which, for purposes of clarity, is not illustrated. The gas line 1 is the exhaust gas line of the gas turbine and has exhaust gas flowing through it, as gaseous medium 2, in the direction of the arrow. The gas line 1 widens out into an SCR reactor 3 in which a reduction catalytic converter 5 and a reducing-agent injector 6 are arranged. The reduction catalytic converter 5 is a catalytic converter which is in honeycomb form, is produced as an unsupported extrudate, and is based on titanium dioxide with additions of tungsten trioxide, molybdenum trioxide, and vanadium pentoxide. The reducing-agent injector 6 is an injection grate having a multiplicity of single-fluid nozzles distributed over the flow cross section of the SCR reactor 3.

The reducing-agent injector 6 is connected via a discharge line 8 to an outlet 9 of a separate preparation reactor 10 for preparing the reducing agent which is required for the deNOx reaction taking place at the catalytic converter 5. The preparation reactor 10 comprises an injection device 11 and a catalyst reactor 12 which assists in the preparation. The injection device 11 of the preparation reactor 10 is connected, via a supply line 14, to a reservoir 16 for the substance 18 which is to be prepared or converted into the reducing agent. In the present case, the substance to be converted which is used is an aqueous urea solution which is converted into urea in the preparation reactor 10 and is injected into the SCR reactor 3 as reducing agent via the reducing-agent injector 6.

The preparation reactor 10 also has a feed point 20 which, via a supply line 21, is connected to the gas line 1 of the gas turbine upstream of the SCR reactor 3, as seen in the flow direction of the gaseous medium 2. A partial stream 22 of the gaseous medium 2 flows into the preparation reactor 10 via the supply line 21 and, as carrier gas, flows through the preparation reactor from the feed point 20 toward the outlet 9. A compressor 23 is arranged in the supply line 21 in order to regulate the amount of the partial stream 22 which flows through. The compressor 23 is controlled by means of a proportional/integral (PI) controller 24 which, in order to provide regulation, evaluates the pressure values obtained from a pressure pick-up 25 connected downstream of the compressor 23.

Similarly to the reducing-agent injector 6, the injection device 11 is implemented as an injection grate which extends across the cross section of the preparation reactor 10. However, the nozzles used for the preparation reactor 10 are so-called two-fluid nozzles 26, in which at the outlet opening of the nozzle the substance to be injected is mixed with a compressed gas, for example compressed air. The injection causes the substance 18 which is to be converted (in the present case an aqueous urea solution) to be mixed in the preparation reactor 10 with the partial stream 22 flowing through it. The temperature of the partial stream 22 of the exhaust gas, which is approx. 200° C., leads to the urea being broken down into ammonia and carbon dioxide, partially by pyrolysis and partially by hydrolysis. The byproducts which are also formed in the process, such as for example melamine or, in the presence of sulfur oxides, ammonium sulfate, are deposited while they are still in the preparation reactor 10 and do not enter the exhaust gas line 1 of the gas turbine. To assist the conversion of the urea, the part stream 22, together with the urea which has been introduced and has in part already been converted into ammonia, is passed through the catalyst 12, which is designed as a hydrolysis catalyst. The hydrolysis catalyst 12, like the reduction catalytic converter 5, is a ceramic unsupported extrudate monolith in honeycomb form, the material of which consists of titanium dioxide with additions of vanadium pentoxide, aluminum trioxide, and silicon oxide. With single-stage injection as shown, the superficial loading of the catalyst 12, that is to say the ratio of the inflow area of the catalyst 12 to the amount of the substance to be converted passing through the reactor, may be up to 0.01 $m^3/(l/h)$. Good conversion of the urea into ammonia is achieved if the length of the preparation reactor 10 is between 4 and 6 m. Multistage injection may also take place in the preparation reactor 10, in which case a catalyst 12 is arranged downstream of each injection device 11. The choice between single-stage or multistage injection depends on the prevailing conditions of use.

Finally, the partial stream 22 which has been mixed with the reducing agent urea passes via the outlet 9 into the discharge line 8, where a static mixer 27 is additionally arranged in order to provide better mixing.

For the substance 18 which is to be converted to be metered into the preparation reactor 10, the substance 18 is conveyed into the feed line 14 from the reservoir 16 by means of a pump 28, via a suction intake 29 and a filter 30. To ensure that the pressure in the feed line 14 is approximately constant, an overflow valve 32 is arranged in a return line. Furthermore, the supply line 14, for accurate metering of the substance into the preparation reactor 10, includes a control valve 33 which is controlled by means of a volumetric flow rate detector 34. A compressor 35 is provided for generating the compressed air which is required for the two-fluid nozzles arranged in the injection device 11.

To control the amount of reducing agent which is introduced into the SCR reactor 3 per unit time, the discharge line 8 contains a control valve 40. Therefore, it is possible to exactly meter the amount of reducing agent which is to be introduced into the SCR reactor 3 per unit time by means of the controlled supply of a partial stream 22 and the amount of urea which is introduced into the preparation reactor 10 per unit time.

A parallel top-up line 38 is provided in addition to the discharge line 8, via which top-up line additional reducing agent can be introduced separately by means of a further control valve 41. This top-up line 38 is used to a certain extent as a safety measure if the conversion of urea in the preparation reactor 10 were to fail for technical reasons.

Figure 2:
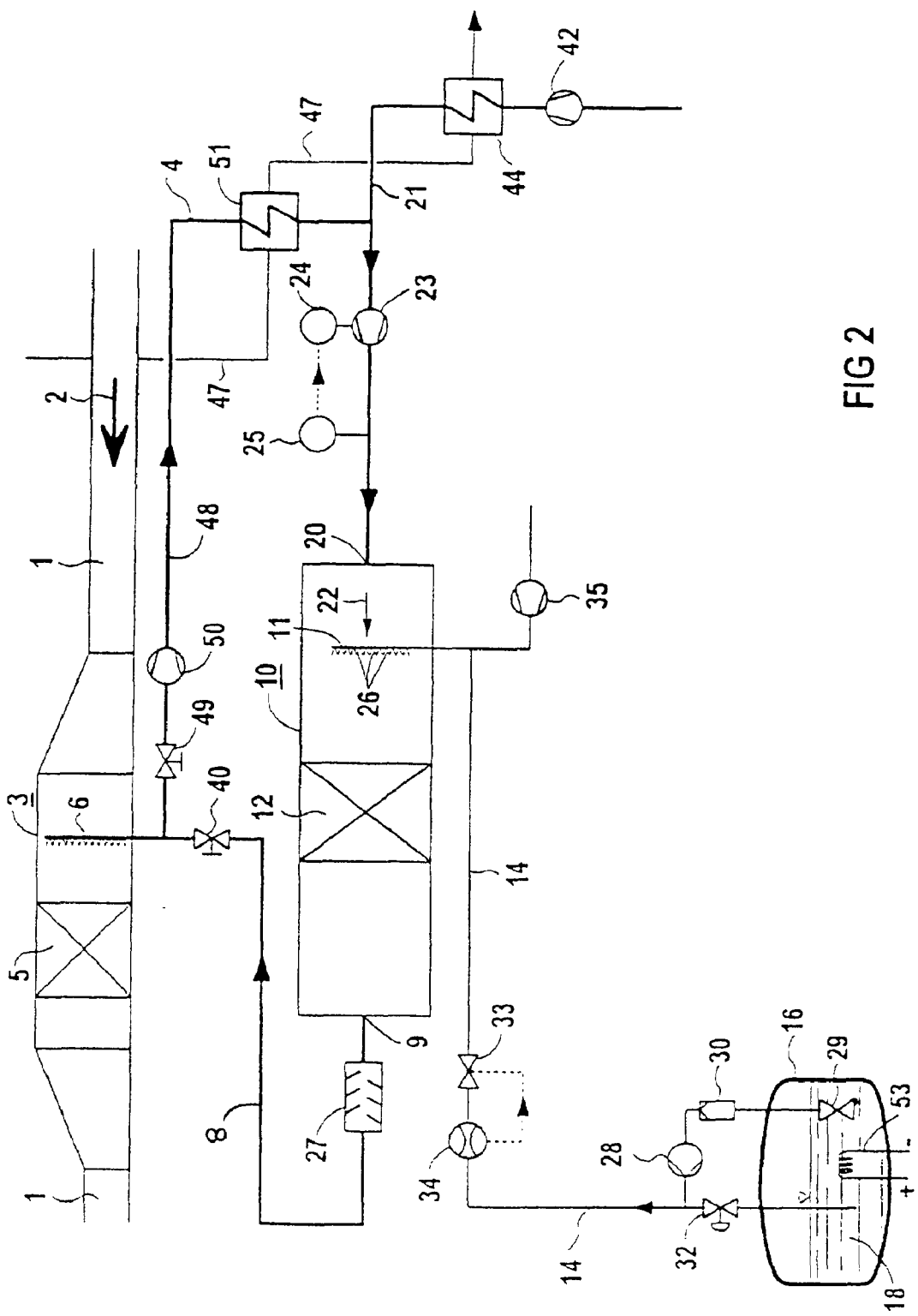
FIG. 2 is a diagrammatic view of the device similarly to FIG. 1, but with the separate preparation reactor implemented as a loop reactor and with heat exchangers additionally being provided for heating the carrier gas.

Referring now to FIG. 2, in the deNOxing device illustrated in FIG. 2, as compared with the deNOxing device illustrated in FIG. 1, the carrier gas flowing through the preparation reactor 10 is not a partial stream 22 of the gaseous medium 2 which is to be treated, but rather heated air. The air is provided to the preparation reactor 10 via the supply line 21 by means of a compressor 42. A heat exchanger 44 through which hot process gas or steam from the gas turbine flows via a line 47 is used to heat the air.

In addition, part of the gas mixture flowing inside the discharge line 8 can be returned to the supply line 21 via a branch line 48. Therefore, the preparation reactor 10 is to a certain extent designed as a "loop reactor". The branch line 48 makes it possible to restrict the amount of carrier gas required for the conversion and, at the same time, to concentrate the amount of the proportion of reducing agent which is contained in the gas mixture flowing through the discharge line 8. For this purpose, the amount of gas mixture flowing back into the preparation reactor 10 via the branch line 48 per unit time is controlled by means of the control valve 49 and the compressor 50. To prevent cooling of the gas mixture flowing back via the branch line 48, a further heat exchanger 51, which also has the hot process gas or steam from the gas turbine flowing through it via the line 47, is arranged on the branch line 48.

In addition, an electric heater 53 for preheating of the substance 18 is arranged at the reservoir 16.

We claim:

1. A process for selective catalytic reduction of nitrogen oxides in an oxygen-containing gaseous medium, which comprises:

conducting a carrier gas through a preparation reactor disposed outside a stream of a gaseous medium;

introducing a substance to be converted into reducing agent into the carrier gas and converting the substance into reducing agent in the preparation reactor, and thereby supplying energy for a thermal conversion with the carrier gas;

adding the reducing agent to the gaseous medium upstream of a reduction catalytic converter and reducing nitrogen oxides in the gaseous medium; and branching off a portion of the carrier gas after having passed through the preparation reactor and feeding back the portion to the preparation reactor.

2. The process according to claim 1, which comprises branching off a partial stream of the gaseous medium from the stream of the gaseous medium, and passing the partial stream through the preparation reactor as the carrier gas, and adding the partial stream to the stream of the gaseous medium together with the reducing agent.

3. The process according to claim 1, which comprises preheating the substance and introducing the preheated substance into the preparation reactor.

4. The process according to claim 1, which comprises injecting the substance into the carrier gas in the preparation reactor via a pressure line.

5. The process according to claim 1, wherein the substance is an aqueous urea solution and the reducing agent formed in the preparation reactor is ammonia.

6. The process according to claim 1, wherein the substance is ammonia water, and the reducing agent formed from the ammonia water in the preparation reactor is ammonia.

7. The process according to claim 1, which comprises bringing the carrier gas, together with the substance introduced into the carrier gas, into contact with a catalyst in the preparation reactor and thereby assisting the conversion in the preparation reactor.

* * * * *